United States Patent [19]
Keane

[11] Patent Number: 4,936,684
[45] Date of Patent: Jun. 26, 1990

[54] SPECTROMETER WITH PHOTODETECTOR ARRAY DETECTING UNIFORM BANDWIDTH INTERVALS

[75] Inventor: Thomas J. Keane, Gaithersburg, Md.

[73] Assignee: Pacific Scientific Company, Newport Beach, Calif.

[21] Appl. No.: 328,302

[22] Filed: Mar. 24, 1989

[51] Int. Cl.$^5$ .............................................. G01J 3/36
[52] U.S. Cl. .................................................... 356/328
[58] Field of Search ................ 356/300, 326, 328, 308

[56] References Cited

U.S. PATENT DOCUMENTS

| | | | |
|---|---|---|---|
| 3,880,523 | 4/1975 | Thomas | 356/328 |
| 4,443,108 | 4/1984 | Webster | 356/418 |
| 4,669,880 | 6/1987 | Nelson et al. | 356/326 |

Primary Examiner—F. L. Evans
Attorney, Agent, or Firm—Leydig, Voit & Mayer

[57] ABSTRACT

In a color measuring spectrometer employing a reflecting grating and a linear array of photodetectors for measuring different components of a spectrum, the width of the photodetectors varies throughout the length of the array. The width of each photodetector is selected so that each photodetector detects the same bandwidth interval measured in wavelengths.

6 Claims, 2 Drawing Sheets

SPECTROMETER WITH PHOTODETECTOR ARRAY DETECTING UNIFORM BANDWIDTH INTERVALS

This invention relates to spectrometers and more particularly to spectroscopic color measuring instruments of the type having a fixed grating and an array of photodetectors in the spectrometer housing to detect different components of the spectrum dispersed by the grating.

BACKGROUND OF THE INVENTION

Spectrometers, which find use in measuring the color of samples, operate by dispersing light reflected from or transmitted through a sample into its spectral components and then measuring the intensities of the different spectral components. The spectrometers normally comprise a housing defining an entrance slit to receive light reflected from or transmitted through the sample into the spectrometer housing, a grating positioned within the housing to receive the light passing through the entrance slit, and an exit slit in the housing positioned to transmit a narrow bandwidth of the spectrum to a photodetector which measures the intensity of the component of the spectrum passing through the exit slit. The grating is usually pivotable with respect to the housing to direct different narrow band components of the spectrum through the exit slit for detection.

In some modern spectrometers, instead of employing a pivotable grating and an exit slit, an array of photodetectors is mounted within the spectrometer housing an arranged to detect several components of the spectrum simultaneously. By using an array of photodetectors, the intensity of the components of the spectrum of interest can be obtained in a much shorter time period than is possible with the spectrometer employing a pivotable grating.

In these spectrometers employing a fixed array of photodetectors, the photodetectors are rectangularly shaped and are mounted contiguously so that adjacent photodetectors detect adjacent components in the spectrum. In one device, the photodetectors are about 1 millimeter wide and each detects a component of the spectrum of about 10 nanometers in bandwidth.

Prior to the present invention, the photodetectors in arrays, were all of the same width. However, the dispersion of the spectrum over the array by the grating does not vary linearly with wavelength. As a result, each photodetector detects a bandwidth which is slightly different from the adjacent photodetector, and the difference in the bandwidth detected changes throughout the spectrum from one end of the photodetector array to the other. In the prior art instruments, the bandwidth interval detected by each photodetector was assumed to be the same. This assumption led to errors in color measurements which compare reflectance from, or transmittance through, a sample with standards which have been determined for fixed bandwidth intervals that are carefully calibrated with the color response of the human eye. In order for these comparisons to be precise, the bandwidth intervals used by the color measuring instrument should be the same as the used in the calibrated standards.

SUMMARY OF THE INVENTION

In accordance with the present invention, the width of each photodetector is selected so that each photodetector will detect a bandwidth interval exactly 10 nanometers in width. With this arrangement, the width of the photodetectors varies from one end of the array to the other. As a result, the color measurements made by the instrument correlate precisely with the color measurement standards determined for 10 nanometer uniform bandwidth intervals.

DESCRIPTION OF THE PREFERRED EMBODIMENT

Figure 1:
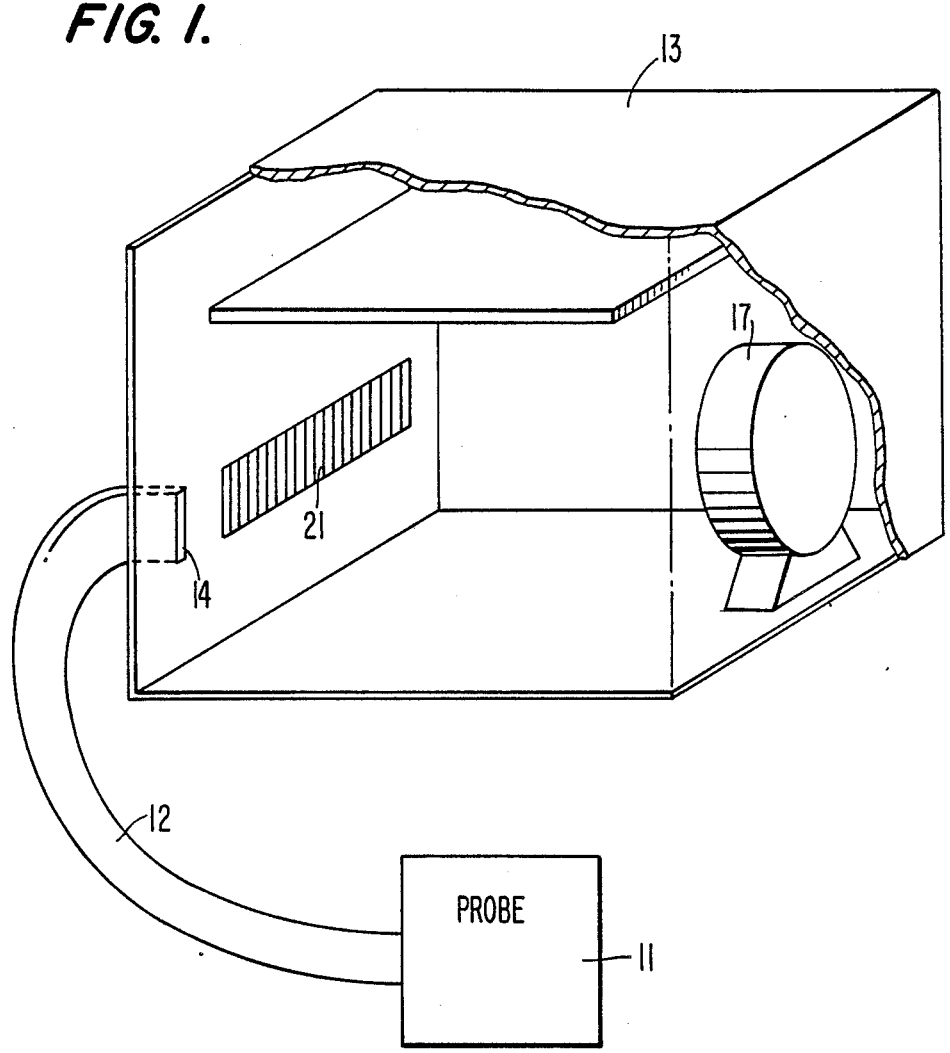
FIG. 1 schematically illustrates an instrument of the present invention with the housing thereof partially broken away.
Figure 2:
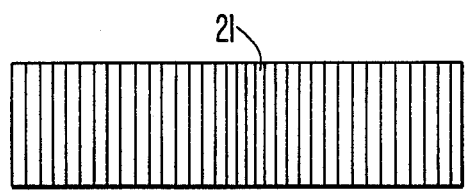
FIG. 2 is a view in elevation of the photodetector array employed in the instrument of FIG. 1.

As shown in FIG. 1, a color measuring instrument according to the present invention comprises a probe 11 connected by a fiber optic bundle 12 to a spectrometer housing 13. The probe may be one like that disclosed in copending application Ser. No. 868,700, filed May 30, 1986 and invented by the inventor of this application. Alteratively, an integrating sphere probe may be employed like that disclosed in copending application Ser. No. 293,621, filed Jan. 5, 1989, also invented by the inventor of this application. As in these copending applications, light reflected from a sample and received by the probe is carried by the fiber optic bundle 12 back to the spectrometer housing 13, where a transmitting end 14 of the fiber optic bundle 12 is formed into the shape of an entrance slit for the spectrometer. Light received from the sample is emitted from the transmitting end 14 of the fiber optic bundle 12 and illuminates a grating 17 within the spectrometer housing. The grating 17 disperses the light into a spectrum over an array of photodetectors 21. In the preferred embodiment, the grating 17 is a concave holographic grating, which focuses the spectrum into a nominally flat plane, in which the photosensitive surfaces of the photodetectors 21 are located. This plane of the array 21 is called the detector plane. The array 21 may contain 35 photodetectors positioned to detect a spectrum extending from 380 nanometers to 720 nanometers. As shown in FIG. 2, the photodetectors of the array 21 are arranged contiguously and vary in width from one end of the array to the other, progressively changing in size in accordance with a sine wave function so that each photodetector has a width that will detect a spectral component having a bandwidth interval of exactly 10 nanometers.

The width of each photodetector can be determined by the formula expressing the relationship between the incident light and the light diffracted by the in grating. This formula is:

$$\sin \alpha + \sin \beta = nk\lambda. \tag{1}$$

wherein $\alpha$ is the angle of the light incident upon the grating, $\beta$ is the angle with which a spectral component is diffracted by the grating, n is the order of the spectrum dispersion, which will normally be 1, k is the grating constant which is the number of grooves in the grating per unit length, and $\lambda$ is the wavelength of the spectral component. From formula (1), the expression for the diffraction angle $\beta$ can be derived as follows:

$$\beta = \arcsin(nk\lambda - \sin\alpha) \qquad (2)$$

Figure 3:
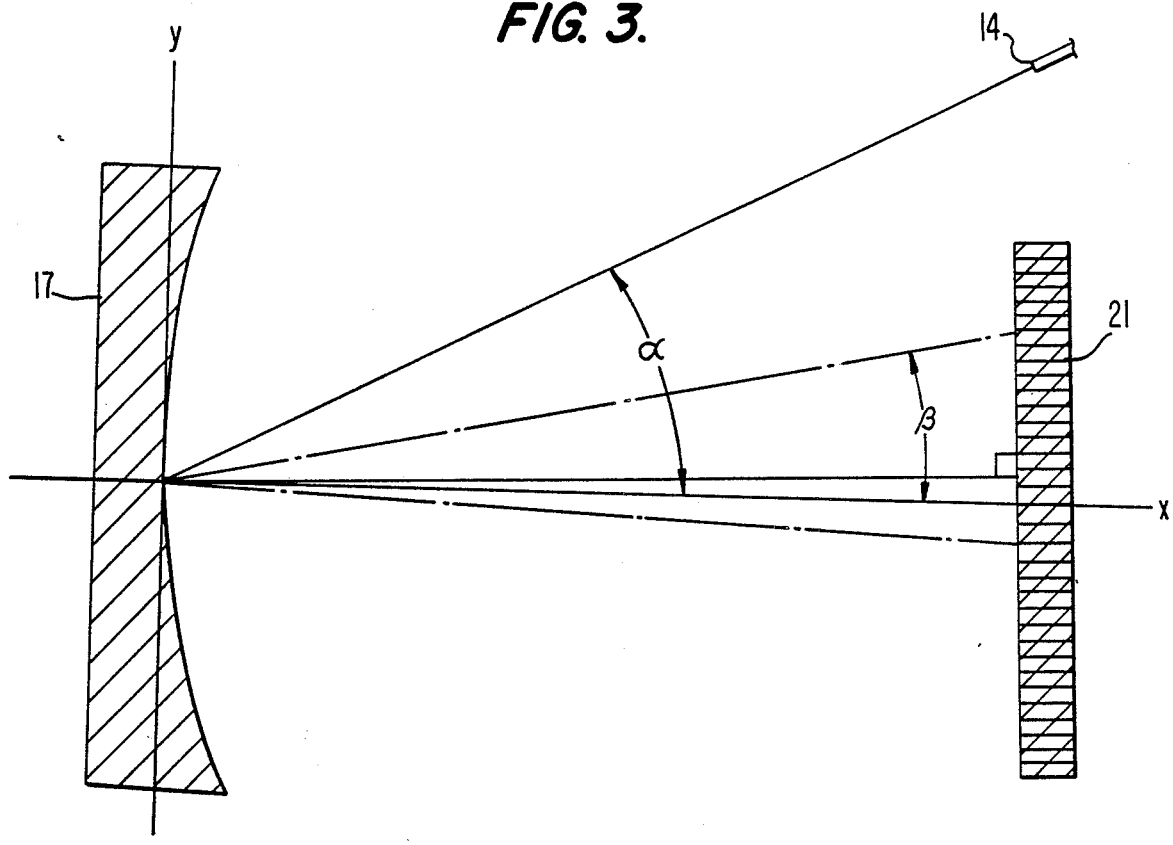
FIG. 3 is a sectional view of the grating and photodetector array of FIG. 2 overlaid with a set of cartesian coordinates for explaining how the width and location of the photodetectors in the instrument are determined.

FIG. 3 shows a set of cartesian coordinates in the plane bisecting the grating 17 and the photodetector array 21 with the center of the grating being the origin of the cartesian coordinates and the perpendicular to the grating line coinciding with the x axis of the cartesian coordinates. In this set of cartesian coordinates, the equation for the coordinates of the point at which a diffracted spectral component impinges upon the photodetector array are related in accordance with the following equation:

$$y = x \tan\beta \qquad (3)$$

The detector plane will not be perpendicular to the x axis, but will be displaced from this position by a small angle, for example, 0.6 degrees. Accordingly, the equation for the line defined by the intersection of the plane of FIG. 3 and the array of photodetectors can be expressed as the following equation:

$$y = mx + b \qquad (4)$$

In this equation, m is the slope of the line and b is the point at which the line intersects the y axis. Equations (3) and (4) are a pair of simultaneous equations from which can be determined the x and y coordinates of the point at which any diffracted ray from the grating impinges upon the photodetector array. Then from the values of y, the displacement of each point along the photodetector array can be calculated. In this manner, the position and width of each of the photodetectors for detecting a 10 nanometer bandwidth can be determined. For example, to determine the width of a detector having a central wavelength of 420 nanometers, the simultaneous equations (3) and (4) would be solved for 415 and 425 nanometers to get the x and y coordinates for the two edges of the 420 nanometer photodetector. The width of the detector then can be determined by determining the separation of these edges along the line represented by $y = mx + b$.

For a particular grating having an incident angle from the entrance slit of 16.719 degrees, a grating constant of 600 lines per millimeter and with the entrance slit located 201.4 millimeters from the center of the grating, a spectrum can be focused onto the detector plane, the normal of which is 0.6 degrees from the normal of the grating and the distance of which, from the center of the grating, measured along the normal to the array, will be 210.45 millimeters. For this specific grating, the width of the photodetectors each detecting a 10 nanometer increment of the spectrum ranging from 380 nanometers to 720 nanometers is given in the table below:

TABLE 1

| Wavelength | Detector Width |
|---|---|
| 380 | 1.2712 |
| 390 | 1.2698 |
| 400 | 1.2684 |
| 410 | 1.2672 |
| 420 | 1.2662 |
| 430 | 1.2653 |

TABLE 1-continued

| Wavelength | Detector Width |
|---|---|
| 440 | 1.2645 |
| 450 | 1.2639 |
| 460 | 1.2634 |
| 470 | 1.2631 |
| 480 | 1.2628 |
| 490 | 1.2627 |
| 500 | 1.2628 |
| 510 | 1.2630 |
| 520 | 1.2633 |
| 530 | 1.2638 |
| 540 | 1.2644 |
| 550 | 1.2651 |
| 560 | 1.2660 |
| 570 | 1.2670 |
| 580 | 1.2682 |
| 590 | 1.2695 |
| 600 | 1.2709 |
| 610 | 1.2725 |
| 620 | 1.2742 |
| 630 | 1.2760 |
| 640 | 1.2780 |
| 650 | 1.2802 |
| 660 | 1.2825 |
| 670 | 1.2849 |
| 680 | 1.2875 |
| 690 | 1.2902 |
| 700 | 1.2931 |
| 710 | 1.2962 |
| 720 | 1.2994 |

Figure 4:
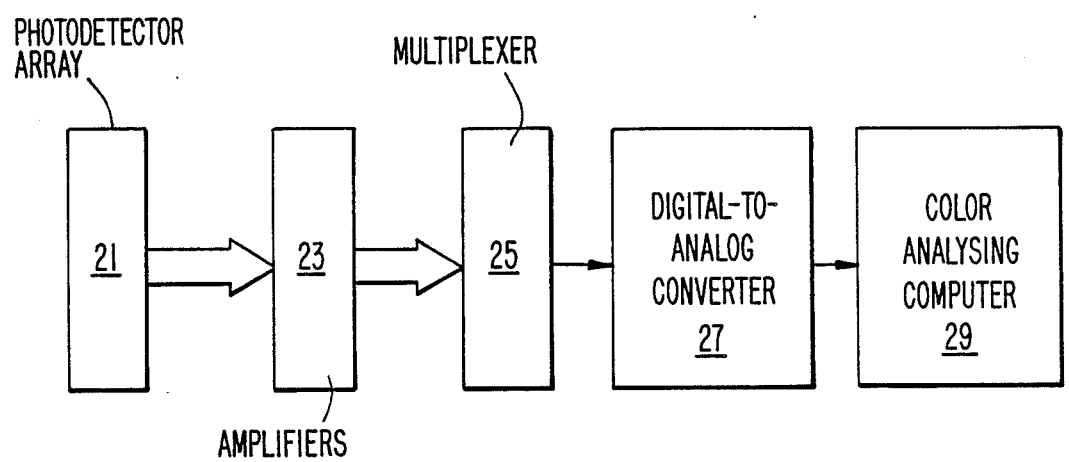
FIG. 4 is a block diagram illustrating the circuitry of the instrument.

As shown in FIG. 4, the output signals from the photodetectors 21 are amplified by amplifiers 23 and applied to a multiplexer 25 which applies the output signals from the amplifiers 23 in sequence to an analog-to-digital converter 27. The analog-to-digital converter converts each applied analog signal value to a digital value and applies it to a computer 29, which operates on the received digital values to provide a quantative indication of color measurement in accordance with the color measurement standards which have been predetermined for 10 nanometer bandwidth intervals. The quantative indication is determined in a manner similar to that described in the above-mentioned copending application Ser. No. 868,700.

With the color measuring instrument using an array of photodetectors varying in width as described above, each photodetector will detect a uniform bandwidth interval. As a result, precise color measurement is achieved.

The above description is of a preferred embodiment of the invention and modification may be made thereto without departing from the spirit and scope of the invention which is defined in the appended claims.

I claim:

1. A spectrometer comprising means for dispersing received light into a spectrum, a plurality of photodetectors arranged for receiving said spectrum wherein each photodetector is disposed for detecting a bandwidth interval of said spectrum, each of said photodetectors having a width selected so that each photodetector detects the same bandwidth interval measured in wavelengths.

2. A spectrometer as recited in claim 1 wherein said means for dispersing received light into a spectrum comprises a grating and includes means for illuminating said grating with received light.

3. A spectrometer as recited in claim 2 wherein said spectrometer comprises a housing, said grating being mounting in a fixed position in said housing, and means for illuminating said grating including an entrance slit through which received light may pass, said plurality of photodetectors being mounted in a fixed position relative to said entrance slit and said grating.

4. A spectrometer as recited in claim 1 wherein each of said photodetectors detects a bandwidth portion 10 nanometers wide.

5. A photodetector array comprising a plurality of photodetectors arranged contiguously in a linear array for detecting a spectrum, each photodetector having a width selected for detecting the same bandwidth interval measured in wavelengths of the spectrum.

6. A photodetector array as recited in claim 5 wherein each of said photodetectors has a different width, the photodetector widths having a stepwise continuous variation along the linear array.

* * * * *